(12) United States Patent
Yang et al.

(10) Patent No.: US 11,632,584 B2
(45) Date of Patent: Apr. 18, 2023

(54) VIDEO SWITCHING DURING MUSIC PLAYBACK

(71) Applicant: GUANGZHOU KUGOU COMPUTER TECHNOLOGY CO., LTD., Guangzhou (CN)

(72) Inventors: Yabin Yang, Guangzhou (CN); Shengcan Xu, Guangzhou (CN); Chao Xu, Guangzhou (CN); Chongjie Zhao, Guangzhou (CN); Yudong Dai, Guangzhou (CN); Qianyi Wang, Guangzhou (CN); Xun Guo, Guangzhou (CN); Wentao Li, Guangzhou (CN); Meihua Ye, Guangzhou (CN)

(73) Assignee: GUANGZHOU KUGOU COMPUTER TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/415,374

(22) PCT Filed: Nov. 25, 2019

(86) PCT No.: PCT/CN2019/120691
§ 371 (c)(1),
(2) Date: Jun. 17, 2021

(87) PCT Pub. No.: WO2020/125334
PCT Pub. Date: Jun. 25, 2020

(65) Prior Publication Data
US 2022/0057984 A1    Feb. 24, 2022

(30) Foreign Application Priority Data

Dec. 21, 2018 (CN) .......................... 201811575172.6

(51) Int. Cl.
 H04N 21/431  (2011.01)
 G06F 3/0484  (2022.01)
 H04N 21/472  (2011.01)

(52) U.S. Cl.
 CPC ......... *H04N 21/431* (2013.01); *G06F 3/0484* (2013.01); *H04N 21/47205* (2013.01)

(58) Field of Classification Search
 None
 See application file for complete search history.

(56) References Cited

U.S. PATENT DOCUMENTS

| | | | | |
|---|---|---|---|---|
| 4,991,011 A | * | 2/1991 | Johnson | H04N 21/472 |
| | | | | 348/E7.071 |
| 2007/0086280 A1 | * | 4/2007 | Cappello | G11B 20/00086 |

(Continued)

FOREIGN PATENT DOCUMENTS

| | | | | |
|---|---|---|---|---|
| CN | 106649586 A | | 5/2017 | |
| CN | 107734376 A | * | 2/2018 | ......... H04N 21/4307 |

(Continued)

OTHER PUBLICATIONS

European search report of European application No. 19899965.8 dated May 4, 2022.

(Continued)

*Primary Examiner* — Mandrita Brahmachari
(74) *Attorney, Agent, or Firm* — Ice Miller LLP

(57) ABSTRACT

Provided is a method for playing music, applicable to a terminal provided with a music player, including: playing first music by the music player and playing a video in a music playback page, wherein the first music corresponds to at least two videos; receiving a video switching operation in the music playback page, wherein the video switching operation includes at least one of a swipe operation, a tap operation, a long press operation, and a press operation; and (Continued)

switching the video being played in the music playback page in response to the video switching operation, and continuing playing the first music by the music player.

20 Claims, 6 Drawing Sheets

(56) References Cited

U.S. PATENT DOCUMENTS

| | | | | |
|---|---|---|---|---|
| 2008/0018625 | A1* | 1/2008 | Ijichi | H04H 60/56 345/204 |
| 2010/0067863 | A1* | 3/2010 | Wang | G11B 27/034 386/279 |
| 2010/0220979 | A1* | 9/2010 | Ryu | G11B 7/00736 386/E5.064 |
| 2013/0086143 | A1* | 4/2013 | Rossetti | G06F 16/7834 709/203 |
| 2014/0368734 | A1 | 12/2014 | Hoffert et al. | |
| 2015/0254242 | A1* | 9/2015 | Cirrincione | H04N 21/8113 707/722 |
| 2015/0301718 | A1* | 10/2015 | Trollope | G06F 16/632 715/716 |
| 2016/0105724 | A1* | 4/2016 | Bloch | H04N 21/23424 725/38 |
| 2016/0336039 | A1* | 11/2016 | Leiberman | G11B 27/28 |
| 2017/0201781 | A1* | 7/2017 | Itwaru | H04N 21/4788 |
| 2018/0232121 | A1 | 8/2018 | Lewis et al. | |
| 2018/0286458 | A1* | 10/2018 | Harron | G06F 16/438 |
| 2019/0026366 | A1* | 1/2019 | Park | H04N 21/23424 |
| 2019/0278978 | A1* | 9/2019 | Park | G06V 20/41 |

FOREIGN PATENT DOCUMENTS

| | | |
|---|---|---|
| CN | 107734376 A | 2/2018 |
| CN | 109756784 A | 5/2019 |

OTHER PUBLICATIONS

Communication pursuant to Article 94(3) EPC of European application No. 19899965.8 dated May 16, 2022.
International search report of PCT application No. PCT/CN2019/120691 dated Feb. 13, 2020.
First office action of Chinese application No. 201811575172.6 dated Feb. 3, 2020.
Second office action of Chinese application No. 201811575172.6 dated Jul. 13, 2020.
Notification to grant patent right for invention of Chinese application No. 201811575172.6 dated Oct. 23, 2020.

* cited by examiner

VIDEO SWITCHING DURING MUSIC PLAYBACK

This application is a US national stage of international application No. PCT/CN2019/120691, filed on Nov. 25, 2019, which claims priority to Chinese Patent Application No. 201811575172.6, filed on Dec. 21, 2018 and entitled "MUSIC PLAYING METHOD, DEVICE, TERMINAL AND STORAGE MEDIUM", the disclosures of which are herein incorporated by reference in their entireties.

TECHNICAL FIELD

The present disclosure relates to the field of music playback, and in particular relates to a method and apparatus for playing music, and a terminal and storage medium thereof.

BACKGROUND

As a frequently used application in a terminal, a music player is used for providing massive music for users to select to listen.

SUMMARY

Embodiments of the present disclosure provide a method and apparatus for playing music, and a terminal and storage medium thereof, which can solve the problem that the display mode of a music player is monotonous in the related art.

According to an aspect of the present disclosure, a method for playing music is provided. The method is applicable to a terminal provided with a music player and includes:

playing first music by the music player and playing a video in a music playback page, wherein the first music corresponds to at least two videos;

receiving a video switching operation in the music playback page, wherein the video switching operation includes at least one of a swipe operation, a tap operation, a long press operation, and a press operation; and switching the video being played in the music playback page in response to the video switching operation and continuing playing the first music by the music player.

According to another aspect of the present disclosure, a terminal is provided. The terminal includes a processor and a memory storing at least one instruction therein. The at least one instruction, when loaded and run by the processor, causes the processor to perform the method for playing music described in the above aspect.

According to still another aspect of the present disclosure, a computer-readable storage medium storing at least one instruction therein is provided. The at least one instruction, when loaded and run by a processor, causes the processor to perform the method for playing music described in the above aspect.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

When a song is played by using the music player, a user may trigger the music player to synchronously display lyrics of the current song on a music playback interface, or trigger the music player to display album pictures of the album to which the current song belongs on the music playback interface.

However, the display mode of the music player in the related art is monotonous, and only lyric play mode and the album play mode can be provided for the user to select, resulting in that only the lyrics or the album pictures can be viewed by the user when listening to a song.

Figure 1:
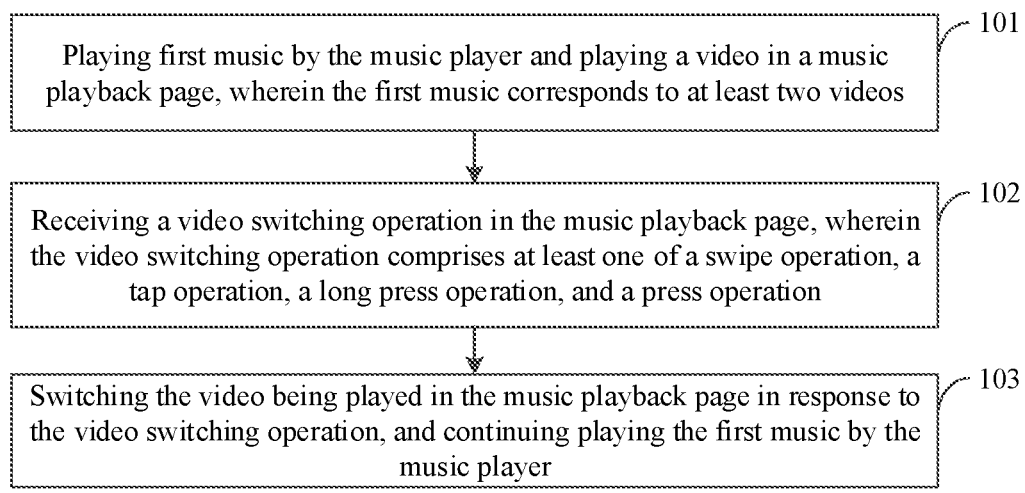
FIG. 1 is a flowchart of a method for playing music according to an exemplary embodiment of the present disclosure.

FIG. 1 is a flowchart of a method for playing music according to an exemplary embodiment of the present disclosure. The method is applicable to a terminal provided with a music player and includes the following steps.

In 101, first music is played by the music player, and a video is played in a music playback page, wherein the first music corresponds to at least two videos.

In some embodiments, the video is a short video. The short video is a video with the picture content recorded by a user, the audio content being a clip of a target music and the duration being less than or equal to a duration threshold. That is, the screen content of the short video is original by the user. Alternatively, the short video is a video with the picture content and audio content being both recorded by the user and the duration being less than or equal to the duration threshold. That is, the screen content and audio content of the short video are both original by the user. Wherein the duration threshold is 15 seconds.

In some embodiments, in a first playback mode, the terminal plays music by the music player, and displays playback elements corresponding to the first playback mode in the music playback page. Upon receiving a mode switching operation, the terminal switches the first playback mode to a second playback mode, stops displaying the playback elements corresponding to the first playback mode in the music playback page, and instead plays the video in the music playback page.

Optionally, the first playback mode is at least one of an album playback mode and a lyrics playback mode. The second playback mode is a newly added playback mode of the music player in the embodiment of the present disclosure. Accordingly, when the first playback mode is the album playback mode, album-related elements, such as album pictures, album names, and the like are displayed in the music playback page. When the first playback mode is the lyrics playback mode, lyrics related elements, such as lyrics information, lyrics timeline producer information, and the like are displayed in the music playback page.

Optionally, in addition to displaying the playback elements corresponding to the first playback mode, default playback controls are also displayed in the music playback page. The default playback controls include at least one of a playback progress bar, a single loop/random/sequential playback control, a sound effect selection control, a sound quality selection control, a pause control, a double speed control, a download control, a comment control, and a favorite control. The present disclosure does not limit the specific type of the default playback control.

In some embodiments, if the first music supports the second playback mode (i.e., the first music corresponds to a video), a playback mode switching control (intended to trigger to switch the playback mode) is displayed in the music playback page, and the playback mode switching control is in a triggerable state. If the first music does not support the second playback mode, the playback mode switching control is not displayed in the music playback page, or the displayed playback mode switching control is in a non-triggerable state.

For example, when the first playback mode is the lyrics playback mode, lyrics 22 corresponding to a current song are synchronously displayed in a music playback interface 21. When a tap operation on a playback mode switching control 23 in the music playback interface 21 is received, the terminal stops displaying the lyrics 22, and displays a video picture 24 in the music playback interface 21.

In other embodiments, in the second playback mode, when the trigger operation on the playback mode switching control is received again, the terminal switches the second playback mode to the first playback mode, and continues to play the first music while keeping the playback progress of the first music in the second playback mode.

Optionally, all or part of the video corresponding to the first music is uploaded by the user. The video played in the music playback interface is acquired by the terminal from a background server corresponding to the music player.

It should be noted that, it is necessary to jump from a music playback page to an MV playback page when watching an MV corresponding to a piece of music in the related art. However, in the embodiment of the present disclosure, the video is directly displayed in the music playback page without page skipping.

In 102, a video switching operation in the music playback page is received, wherein the video switching operation includes at least one of a swipe operation, a tap operation, a long press operation, and a press operation.

During the process of playing the first music and the video, the terminal may receive the video switching operation in the music playback page. The video switching operation is configured to switch the video played in the music playback page by triggering the terminal and the video switching operation may be a swipe operation in a preset direction (e.g., an upward swipe operation to switch to a next video, and a downward swipe operation to switch to a previous video), a tap operation, a long press operation, or a press operation. The embodiment of the present disclosure does not limit the specific form of the video switching operation.

In some embodiments, in response to receiving the video switching operation, the terminal detects whether there is an unplayed video. If there is an unplayed video, step 103 is performed; if there is no unplayed video, a prompt message is displayed to prompt the user that there is no other video available to play.

Figure 2:
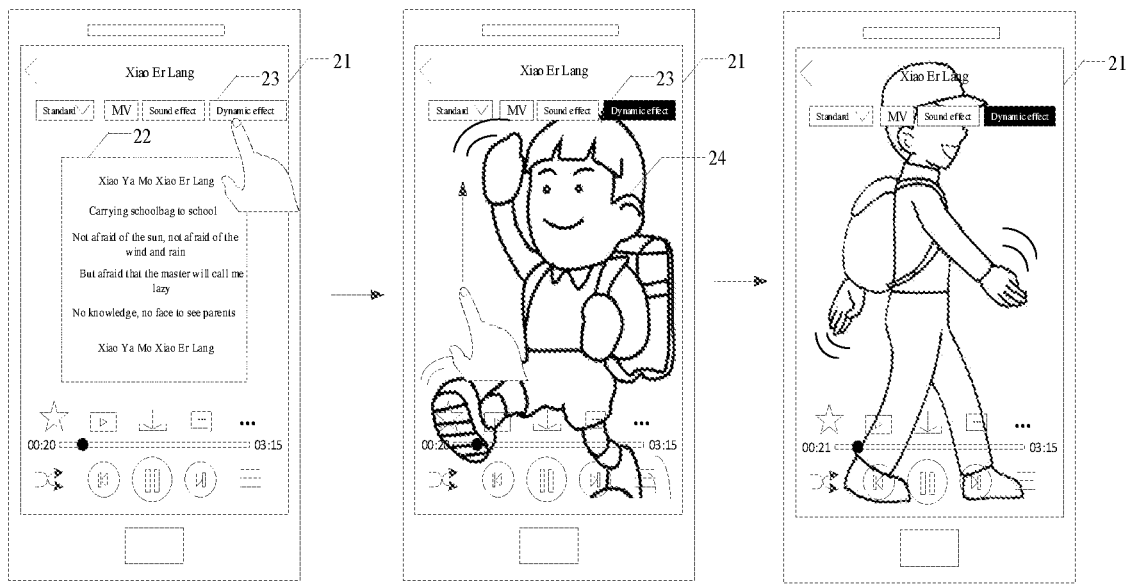
FIG. 2 is a schematic diagram of an interface for implementing the method for playing music shown in FIG. 1.

In an exemplary embodiment, as shown in FIG. 2, the user may switch the video by performing the upward swipe operation in the music playback page 21.

In 103, the video being played in the music playback page is switched in response to the video switching operation, and the first music is continued being played by the music player.

In the related art, it is necessary for a music player to jump to display an MV playback page and start playing the MV from the beginning when a user triggers to play an MV corresponding to a piece of music while listening to the music. However, in the embodiment of the present disclosure, the terminal maintains the playback progress of the first music when switching the video being played in the music playback page, and continues playing the first music by the music player according to the playback progress. That is, the music playback progress is not affected by switching the video.

For example, when the first music is played for 20 seconds, the terminal switches the video and meanwhile continues playing the first music from the playback time point of 20 seconds upon receiving the video switching operation.

In an exemplary embodiment, as shown in FIG. 2, the terminal switches the video picture displayed in the music playback interface 21 in response to the user's upward swipe operation in the music playback page 21.

It should be noted that, compared with a fixed MV bundled with a piece of music, the video played in the music playback page may be a video uploaded by the user in the embodiment of the present disclosure, and the terminal may switch the video being played in the music playback page in response to the user's video switching operation, thereby enriching the content displayed in the music playback page.

Optionally, during the video playback process, the terminal displays a video picture of the $i^{th}$ video in the music playback page, $1 \le i < n$. When the playback of the $i^{th}$ video ends, the terminal displays a video picture of the $(i+1)^{th}$ video in the music playback page, that is, continuing to play a next video. When the playback of the first music ends, the terminal stops the video playing.

In summary, according to the embodiment of the present disclosure, a terminal plays a video in a music playback page while playing music by a music player, and switches the video being played in the music playback page and continues playing the music in response to a video switching operation in the music playback interface. The music player in the embodiment of the present disclosure is added with a playback mode, in which a user can directly watch a video in the music playback page while listening to music, and can switch the video being currently played without the need of additional video applications in the whole process, thereby improving the efficiency of the user watching the video, and enriching the playback mode of the music player.

In addition to manually switching the video, in some embodiments, the terminal may receive a music switching operation in the music playback page during the process of playing the music and the video at the same time. The music switching operation may be a swipe operation (e.g., sliding left and right to switch songs), a tap operation (e.g., a tap operation on a previous song/next song button), a long press operation, and a press operation.

Optionally, upon receiving the music switching operation, the terminal switches the music being currently played in response to the music switching operation, and switches the video being currently played in the music playback interface. The video after switching is a video corresponding to the music after switching.

In an exemplary embodiment, the music player currently plays the first music. Upon receiving the music switching operation, the terminal plays second music by the music player in response to the music switching operation, and plays a video corresponding to the second music in the music playback page. That is, when switching the music being currently played, the terminal switches the video being played in the music playback interface.

In some embodiments, in order to avoid affecting the user's normal listening to music during video playback, in 101, the terminal displays video pictures of the video in a background page of the music playback page. Audio of the video is not played while the video pictures are displayed.

Since the video contains not only the video picture but also the audio (e.g., background music added by the user during video recording), in order to avoid the audio from interfering with the first music being currently played during the video playback process, in some embodiments, the terminal only plays the video pictures of the video when playing the video without decoding and playing the audio of the video, such that the terminal only plays the audio of the first music.

At the same time, in order to prevent the video pictures displayed in the music playback page from shielding other controls in the music playback page, in some embodiments, the terminal displays the video pictures in the background page of the music playback page. That is, the controls in the music playback page are disposed on an upper layer of the video pictures to prevent the video pictures from shielding the controls.

In an exemplary embodiment, as shown in FIG. 2, when the video picture 24 is displayed in the background page of the music playback page 21, various controls are displayed on an upper layer of the video picture 24.

In this embodiment, the terminal displays the video pictures in the background page of the music playback page, and prohibits playing the audio of the video, so as to prevent the video being currently played from affecting the user's listening to music.

In some embodiments, a music server divides the music into m music clips in advance. The music clips may be divided according to lyrics, beats per minute (BPM), or a predetermined time interval, which is not limited in this embodiment.

Figure 3:
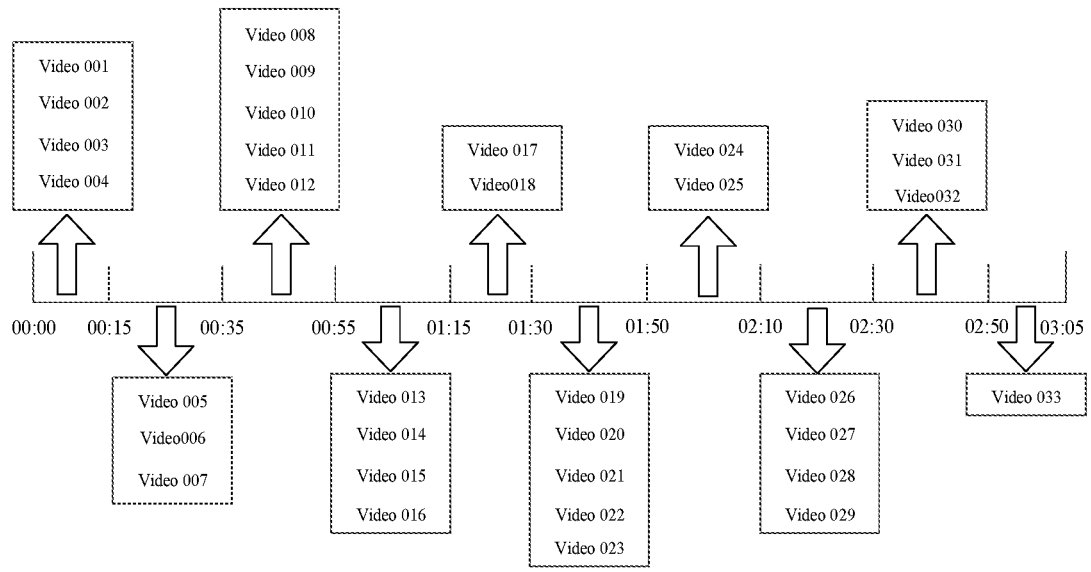
FIG. 3 is a schematic diagram of a correspondence between music clips and video groups according to an embodiment.

In an exemplary embodiment, as shown in FIG. 3, a piece of music of 3 minutes and 05 seconds is pre-divided into 10 music clips (essentially the time axis is divided, not a song is divided into independent clips). The playback time points corresponding to the music clips are: (00:00-00:15), (00:15-00:35), (00:35-00:55), (00:55-01:15), (01:15-01:30), (01:30-01:50), (01:50-02:10), (02:10-02:30), (02:30-02:50), and (02:50-03:05).

For each of the music clips, the music server sets a corresponding video group for the music clip in advance, and each video group is added with at least one video. Optionally, the duration of the video in the video group is greater than or equal to the duration of the music clip to which the video belongs. In an exemplary embodiment, as shown in FIG. 3, the video group corresponding to each music clip includes at least one video.

Regarding the method of selecting a video from the video group, in some embodiments, the music server acquires BPM of a music clip and BPM of the videos (BPM of the audio), calculates a BPM similarity between the music clip and the videos, and adds a video with the BPM similarity greater than a similarity threshold (e.g., 90%) as a candidate video into the video group corresponding to the music clip.

Optionally, for any video group, BPM of the videos in the video group is first BPM, BPM of an audio clip to which the video group belongs is second BPM, and a similarity between the first BPM and the second BPM is greater than a similarity threshold.

Accordingly, when playing a video in the music playback page, the terminal selects a video from a video group corresponding to a music clip to which the current playback time point belongs to play, which is described hereinafter with illustrative embodiments.

Figure 4:
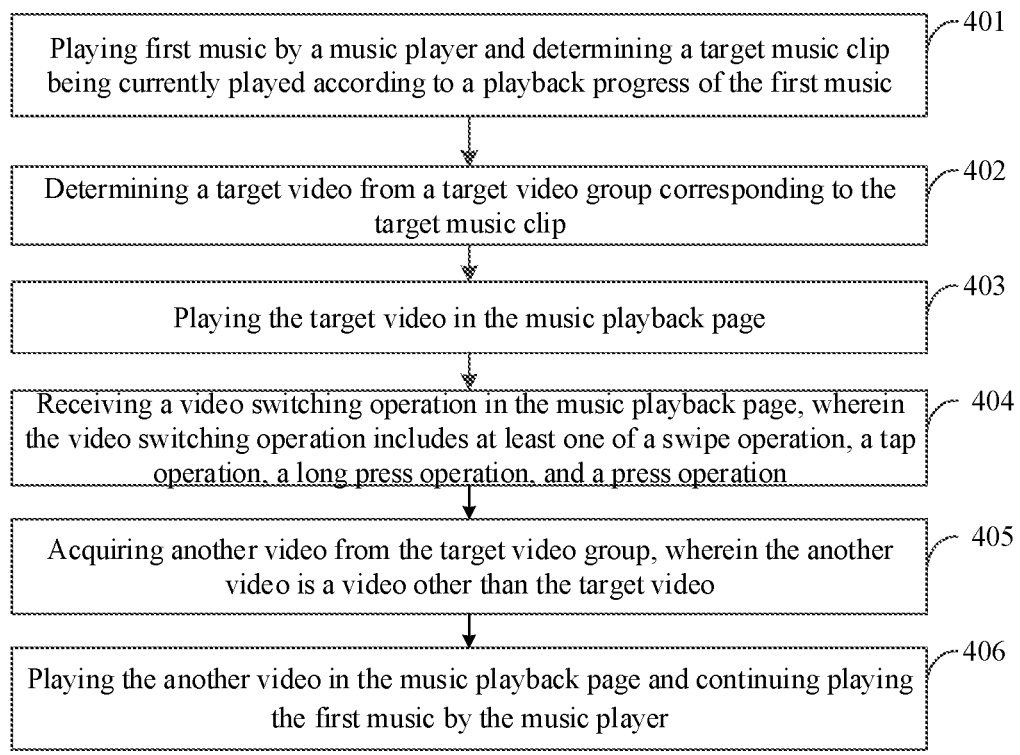
FIG. 4 is a flowchart of another method for playing music according to an exemplary embodiment of the present disclosure.

FIG. 4 is a flowchart of another method for playing music according to an exemplary embodiment of the present disclosure. The method is applicable to a terminal provided with a music player therein and includes the following steps.

In 401, first music is played by a music player, and a target music clip being currently played is determined according to a playback progress of the first music.

Since the terminal only plays a video in a video group corresponding to the current music clip during the process of playing music, the terminal needs to determine the playback progress of the first music in real time.

In some embodiments, the terminal acquires a current playback time point of the first music, and determines a target music clip being currently played based on the current playback time point and playback time intervals corresponding to the music clips.

Based on the music clips divided as shown in FIG. 3, in an exemplary embodiment, when the first music is played for 20 seconds, the terminal determines the second music clip (00:15-00:35) as the target music clip according to the current playback time point 00:20.

In 402, a target video is determined from a target video group corresponding to the target music clip.

Further, the terminal determines a video group corresponding to the target music clip as the target video group, and selects a video from the target video group as the target video.

For selecting the target video from the target video group, in some embodiments, the terminal detects whether the target video group contains a video uploaded by a target account upon determining the target video group in the condition that the videos in the video groups are uploaded by a user.

If the target video group includes the video uploaded by the target account, the video uploaded by the target account is determined as the target video. The target account includes at least one of a current login account and a focus account of the music player.

Optionally, if the target video group does not include the video uploaded by the target account, the terminal randomly selects a video from the target video group as the target video.

In other embodiments, the terminal selects the target video from the target video group according to the video popularity, video click rate, upload time, number of likes and other data of the videos in the target video group, which is not limited in this embodiment.

It should be noted that the step of determining the target video may also be performed by the server. That is, the server determines the target video and sends the same to the terminal. This embodiment only takes the terminal requesting the server to acquire the target video after determining the target video as an example for illustrative description.

In 403, the target video is played in a music playback page.

Further, the terminal displays video pictures of the target video in a background page of the music playback page, and stops playing audio of the target video while playing the video pictures.

During the process of playing the music clips, the terminal only selects a video from a corresponding video group for playing. Switching the playback mode during the play of the current music clip (i.e., switching from not playing video to playing video) and playing the target video from the beginning may cause the current music clip to end but the target video not yet end, which affects the play of a video corresponding to a next music clip.

For example, as shown in FIG. 3, the duration of each of the videos in the video group corresponding to the second music clip (00:15-00:35) is 20 s. When the playback mode is switched at 00:20, the terminal determines a video 005 as the target video and play the same from the beginning. As a result, when the play of the second music clip ends, the video 005 is still unplayed for 5 seconds.

In order to avoid the above problems, in some embodiments, the terminal acquires playback duration where the target music clip has been played, and determines a playback start point of the target video according to the playback duration, such that the video picture of the target video is displayed in the background page of the music playback page according to the playback start point.

For example, as shown in FIG. 3, the durations of each of the videos in the video group corresponding to the second music clip (00:15-00:35) is 20 s. When the playback mode is switched at 00:20, the terminal determines the video 005 as the target video and plays the video 005 from the 5th second of the video 005.

In 404, a video switching operation in the music playback page is received, the video switching operation including at least one of a swipe operation, a tap operation, a long press operation, and a press operation.

For the implementation of this step, reference may be made to the above step 102, which is not repeated herein.

In 405, another video from the target video group is acquired, wherein the another video is a video other than the target video.

In some embodiments, the user may switch the video at any time during the play of the first music. Upon receiving the video switching operation, a terminal determines a music clip being currently played according to the time point when the video switching operation is received, and acquires a video group corresponding to the music clip being currently played, such that a video in the video group other than the video being currently played is determined as the another video. In this embodiment, the present embodiment is schematically described only by taking a fact that the video switching operation is received at the time when the target music clip is played as an example.

In some embodiments, in response to the received video switching operation, the terminal selects another video other than the target video from the target video group for switching and playing subsequent video.

As shown in FIG. 3, when the video switching operation is received at the time when the second music clip is played (for example, the video 005 in the video group corresponding to the second music clip being currently played is played), the terminal acquires videos 006 and 007 from the video group.

In 406, the another video is played in the music playback page, and the first music is continued being played by the music player.

Figure 5:
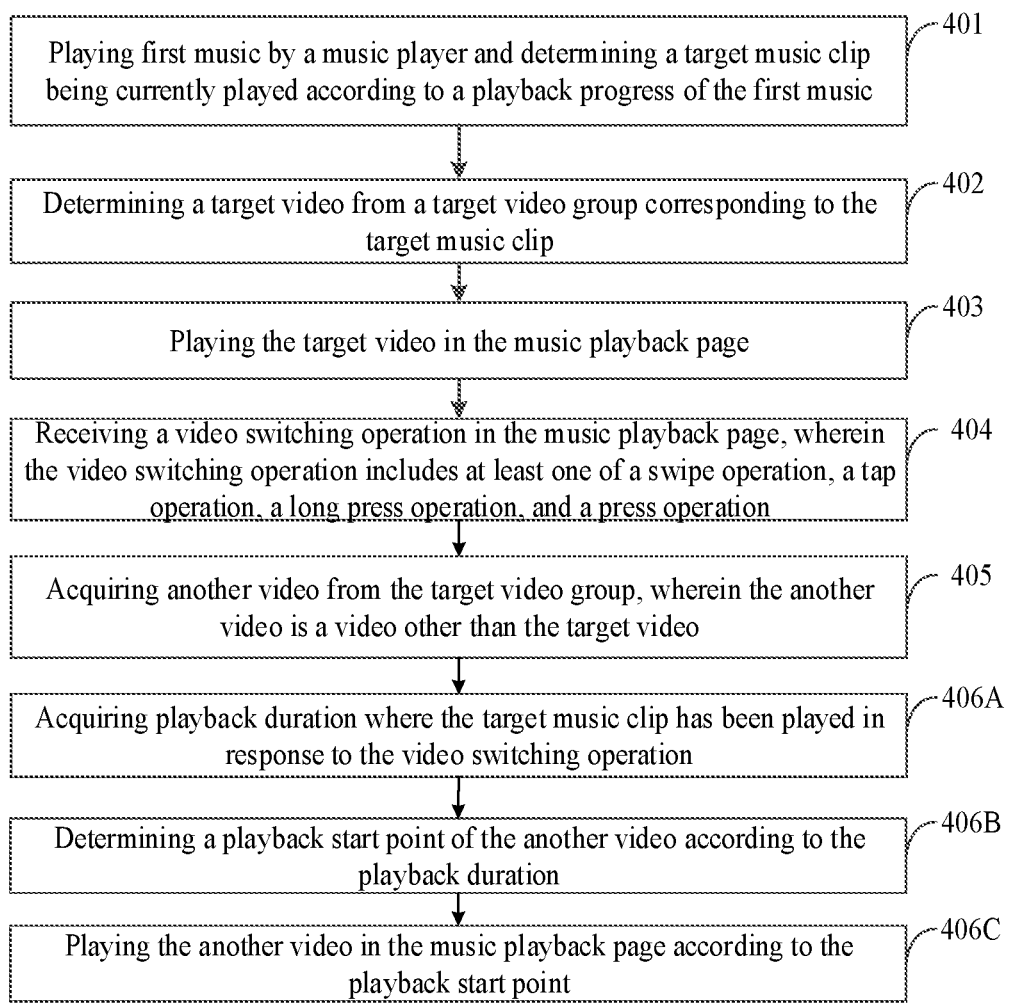
FIG. 5 is a flowchart of yet another method for playing music according to an exemplary embodiment of the present disclosure.

Optionally, the duration of each of the videos in the video group is less than or equal to the duration of the music clip to which the video group belongs. In order to avoid the problem that the video does not end while the target music clip ends since the terminal starts to play the another video from the beginning in response to switching the video, in some embodiments, as shown in FIG. 5, this step may include the following steps.

In 406A, playback duration where the target music clip has been played in response to the video switching operation is acquired.

In some embodiments, when the video switching operation is received in the process of playing the target music clip, the terminal acquires the playback duration where the target music clip has been played at the moment when the video switching operation is received.

Optionally, the playback duration where the target music clip has been played=the current playback time point−the start time point of the target music clip.

In combination with the clips divided as shown in FIG. 3, in an exemplary embodiment, when the video switching operation is received at 00:22, the terminal determines that the playback duration where the target music clip has been played is 7 s according to the current playback time point 00:22 and the start time point 00:15 of the target music clip.

In 406B, a playback start point of the another video is determined according to the playback duration.

According to the determined playback duration, the terminal further determines the playback start point of the another video, such that the another video is subsequently played from the playback start point, instead of playing the other video from the beginning.

In combination with the examples in the above steps, the terminal determines that the playback start point of the another video is the 7th second according to the 7 s of playback duration.

In 406C, the another video is played in the music playback page according to the playback start point.

Further, in the background page of the music playback page, the terminal starts to play the another video from the playback start point to ensure that when the play of the target music clip ends, the play of the video in the background page also ends.

In combination with the example in the above steps, the terminal starts playing from the 7th second of the another video. At this moment, the target music clip has (35−15)−7=13 seconds remaining, and the another video has 20−7=13 seconds remaining. Therefore, after the play of the target music clip ends, the play of the other video also ends, and then a next music clip and a video in the video group are played.

In the embodiment of the present disclosure, upon receiving the video switching operation, the terminal selects a video from a video group corresponding to a current music clip, and determines a playback start point of the video according to playback duration where the current music clip has been played, thereby starting to play the video at the playback start point to avoid the problem that the video does not end while the music clip ends since the video is played from the beginning.

Figure 6:
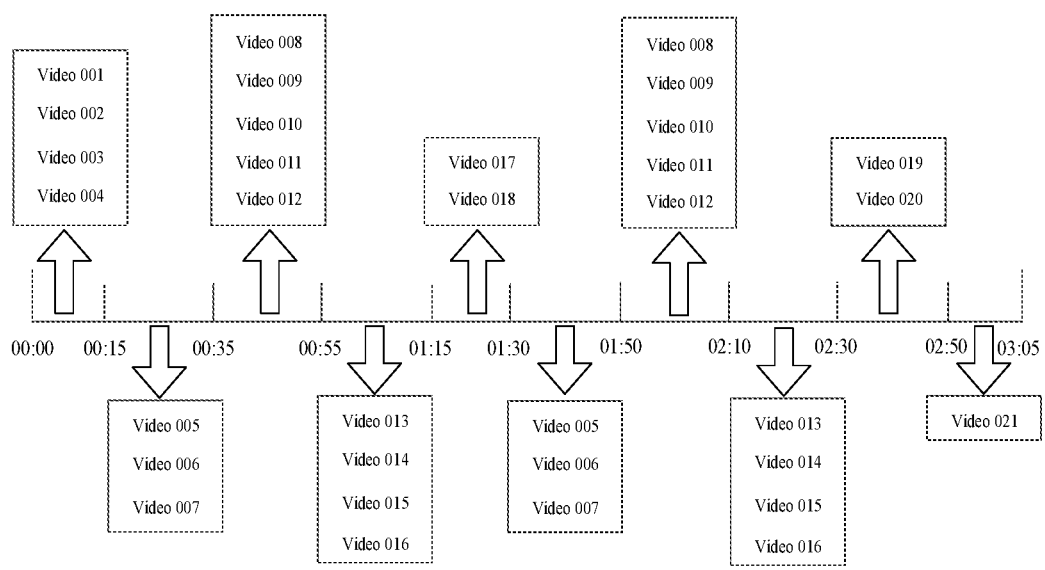
FIG. 6 is a schematic diagram of another correspondence between music clips and video groups according to an embodiment.

In some embodiments, the music may contain repeated music clips (e.g., music clips with consistent melody and lyrics). Accordingly, the server sets the same video group for the repeated music clips. In an exemplary embodiment, as shown in FIG. 6, the second music clip (00:15-00:35) and the sixth music clip (01:30-01:50) are mutually repeated music clips, and thus correspond to the same video group (including videos 005, 006 and 007). The third music clip (00:35-00:55) and the seventh music clip (01:50-02:10) are mutually repeated music clips, and thus correspond to the same video group (including videos 008, 009, 010, 011 and 012). The fourth music clip (00:55-01:15) and the eighth music clip (02:10-02:30) are mutually repeated music clips, and thus correspond to the same video group (including videos 013, 014, 015 and 016).

In order to prevent the terminal from displaying the same video when the repeated music clip is played, in some embodiments, the first music includes n music clips, and the $i^{th}$ music clip and the $j^{th}$ music clip correspond to the same video group ($i \neq j$, and i and j are less than or equal to n). When playing the $i^{th}$ music clip, the terminal sets a preset identifier for the played video in the video group. When playing the $j^{th}$ music clip, the terminal (preferentially) selects a video that does not contain the preset identifier from the video group for playing.

Optionally, the terminal sets a play flag for the videos in the video group, and sets the play flag of the played video from 0 to 1. When selecting a video from the video group for playing, the terminal selects a video whose play flag is 0 from the video group.

In combination with the clips divided as shown in FIG. 6, in an exemplary embodiment, in the process of playing the third music clip, the terminal plays videos 008 and 009, and sets the play flags of the videos 008 and 009 to 1. When playing the seventh music clip, the terminal selects a video from the videos 010, 011, and 012 for playing.

Figure 7:
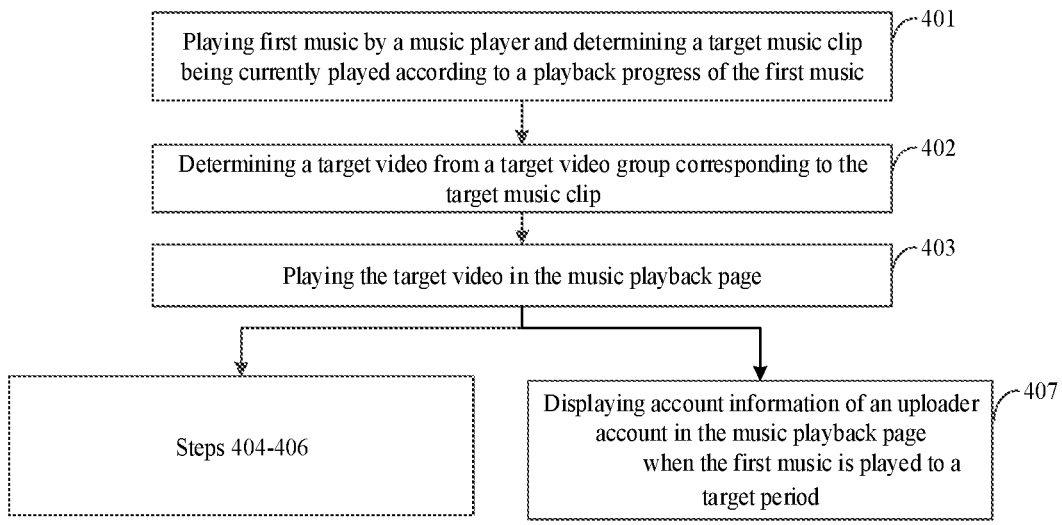
FIG. 7 is a flowchart of still another method for playing music according to an exemplary embodiment of the present disclosure.

In some embodiments, based on FIG. 4, after step 403, the following steps may be further included as shown in FIG. 7.

In 407, when the first music is played to a target period, account information of an uploader account is displayed in the music playback page.

In order to make the user know uploaders of the videos in the music playing process so as to watch other videos uploaded by the uploaders later, the terminal sets at least one target period in advance, and displays, in the music playback page (the first music), account information of uploader accounts corresponding to the videos in the video groups when playing to the target period, or displays account information of an uploader account corresponding to the played video when playing to the ending period. The uploader account is the account for uploading the video.

Optionally, the target period includes at least one of a prelude period, an interlude period, and a tail period. The account information includes an account name and/or an account avatar.

Figure 8:
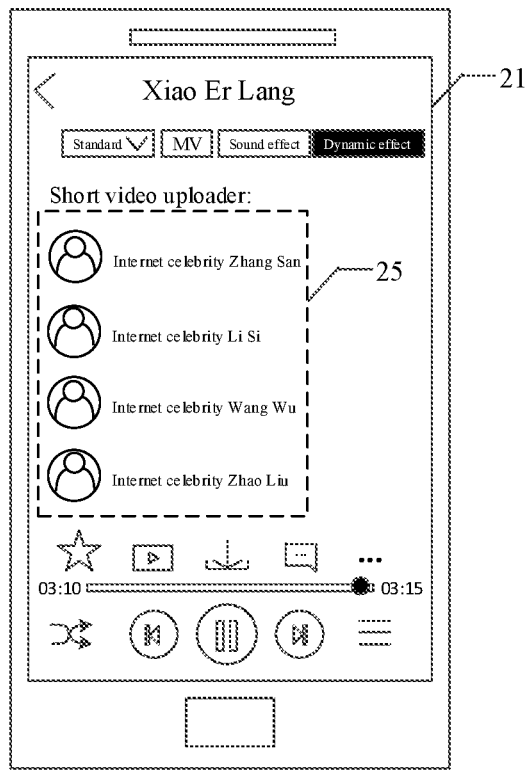
FIG. 8 is a schematic diagram of an interface for displaying account information during a tail period.

In an exemplary embodiment, as shown in FIG. 8, the current playback time point 03:10 is in the ending period. The terminal displays account information 25 in the music playback page 21.

In this embodiment, when the music is played to the target period, the terminal displays the account information of the uploader account corresponding to the video in the music playback page, such that the user can continue to watch other videos uploaded by the specified uploader according to the account information.

Figure 9:
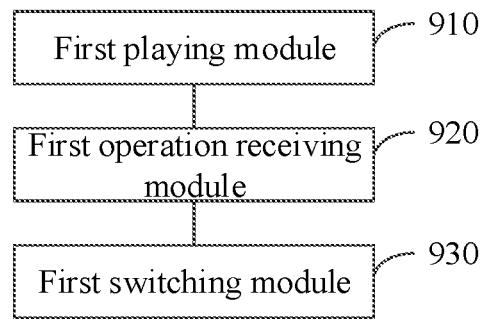
FIG. 9 is a structural block diagram of an apparatus for playing music according to an exemplary embodiment of the present disclosure.

FIG. 9 is a structural block diagram of an apparatus for playing music according to an exemplary embodiment of the present disclosure. The apparatus may be implemented as a terminal or a part of a terminal and includes:

a first playing module 910, configured to play first music by a music player and play a video in a music playback page, wherein the first music corresponds to at least two videos;

a first operation receiving module 920, configured to receive a video switching operation in the music playback page, wherein the video switching operation includes at least one of a swipe operation, a tap operation, a long press operation, and a press operation; and a first switching module 930, configured to switch the video being played in the music playback page in response to the video switching operation, and continue playing the first music by the music player.

Optionally, the apparatus further includes:

a second operation receiving module, configured to receive a music switching operation in the music playback page; and a second switching module, configured to play second music by the music player and play a video corresponding to the second music in the music playback page in response to the music switching operation.

Optionally, the first playing module 910 is configured to:

display video pictures of the video on a background page of the music playback page, wherein audio of the video is not played while the video pictures are displayed.

Optionally, the second switching module 930 is configured to:

continue playing the first music by the music player while keeping a playback progress of the first music.

Optionally, the first music includes n music clips, each of the music clips corresponds to a video group, and the video group includes at least one video.

The first playing module 910 includes:

a target clip determining unit, configured to determine, according to a playback progress of the first music, a target music clip being currently played;

a target video determining unit, configured to determine a target video from a target video group corresponding to the target music clip; and a first playing unit, configured to play the target video in the music playback page.

Optionally, the first switching module 930 includes:

an acquiring unit, configured to acquire another video from the target video group, wherein the another video is a video other than the target video; and a second playing unit, configured to play the another video in the music playback page.

Optionally, the second playing unit is configured to:

acquire a playback duration where the target music clip has been played in response to receiving the video switching operation;

determine a playback start point of the another video according to the playback duration; and play the another video in the music playback page according to the playback start point.

Optionally, the target video determining unit is configured to:

determine a video uploaded by a target account as the target video in response to the target video group including the video uploaded by the target account, wherein the target account includes at least one of a current login account and a focus account of the music player.

Optionally, the apparatus further includes:

an information displaying module, configured to display account information of an uploader account in the music playback page when the first music is played to a target period, wherein the target period includes at least one of a prelude period, an interlude period, and a tail period, and the uploader account is an account for uploading the video.

Optionally, beats per minute (BPM) of the video in the video group is first BPM, and BPM of an audio clip to which the video group belongs is second BPM, a similarity between the first BPM and the second BPM being greater than a similarity threshold.

In summary, according to the embodiment of the present disclosure, a terminal plays a video in a music playback page while playing music by a music player, and switches the video being played in the music playback page and continues playing the music in response to a video switching operation in the music playback interface. The music player in the embodiment of the present disclosure is added with a playback mode, in which a user can directly watch a video in the music playback page while listening to music, and can switch the video being currently played without the need of additional video applications in the whole process, thereby improving the efficiency of the user watching the video, and enriching the playback mode of the music player.

Figure 10:
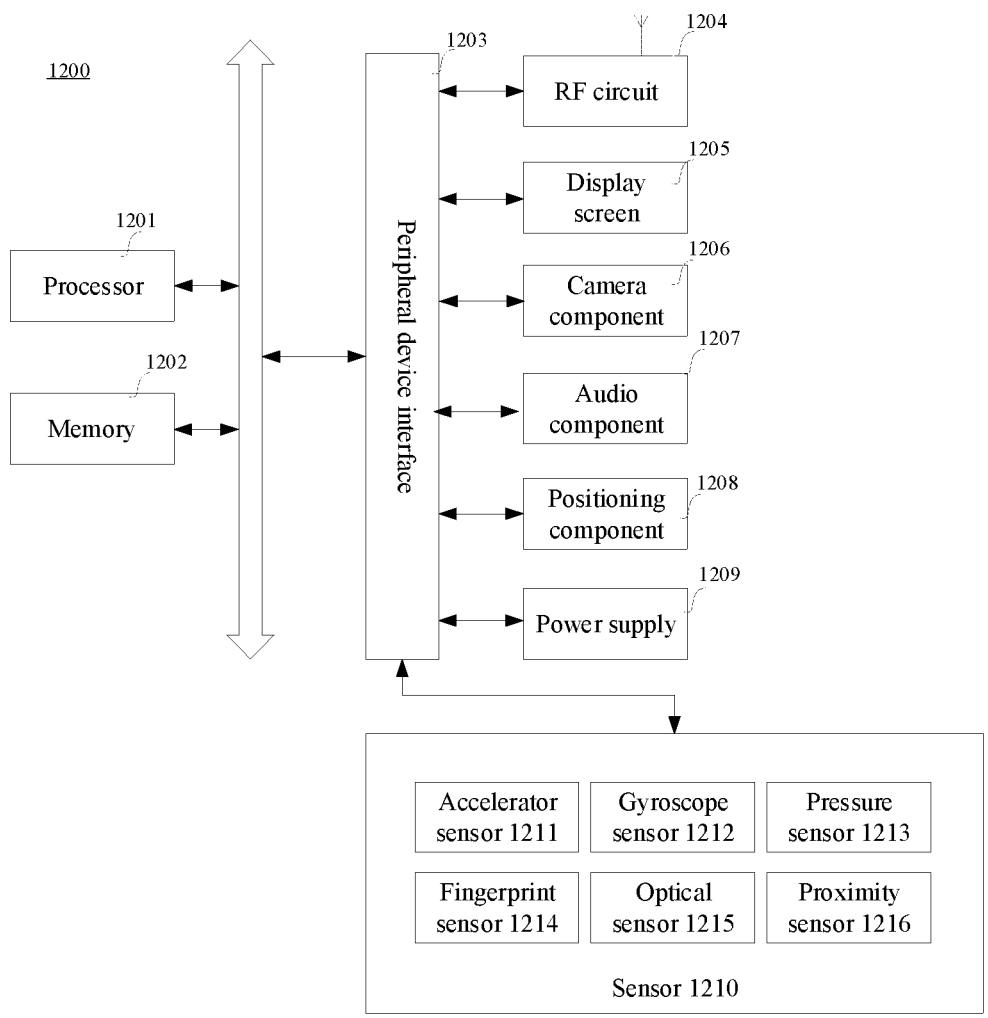
FIG. 10 is a structural block diagram of a terminal according to an exemplary embodiment of the present invention.

FIG. 10 is a structural block diagram of a terminal 1200 according to an exemplary embodiment of the present invention. The terminal 1200 may be a smart phone, a tablet computer, a moving picture experts group audio layer III) player, an MP4 (moving picture experts group audio layer IV (MP3) player, a laptop computer or a desktop computer. The terminal 1200 may also be called user equipment, portable terminal, laptop terminal, desktop terminal and other names.

Generally, the terminal 1200 includes a processor 1201 and a memory 1202.

The processor 1201 may include one or more processing cores, such as a 4-core processor, an 8-core processor, and the like. The processor 1201 may be embodied in at least one hardware form among digital signal processing (DSP), field-programmable gate array (FPGA), and programmable logic array (PLA). The processor 1201 may also include a main processor and a coprocessor. The main processor is a processor used to process data in an awake state, also called central processing unit (CPU). The coprocessor is a low-power processor used to process data in a standby state. In some embodiments, the processor 1201 may be integrated with a graphics processing unit (GPU) which is used for rendering and drawing content that needs to be displayed on a display screen. In some embodiments, the processor 1201 may further include an artificial intelligence (AI) processor which is used to process calculation operations related to machine learning.

The memory 1202 may include one or more computer-readable storage medium, which may be non-transitory. The memory 1202 may also include a high-speed random access memory and a non-volatile memory, such as one or more magnetic disk storage devices and flash memory storage devices. In some embodiments, the non-transitory computer-readable storage medium in the memory 1202 is used to store at least one instruction. The at least one instruction, when run by the processor 1201, causes the processor 1201 to perform the method for playing music according to the method embodiment of the present disclosure.

In some embodiments, the terminal 1200 may optionally further include a peripheral device interface 1203 and at least one peripheral device. The processor 1201, the memory 1202, and the peripheral device interface 1203 may be connected by a bus or a signal line. The peripheral devices may be connected to the peripheral device interface 1203 by a bus, a signal line, or a circuit board. Specifically, the peripheral device includes at least one of an RF circuit 1204, a touch display screen 1205, a camera 1206, audio circuit 1207, a positioning component 1208, and a power supply 1209.

The peripheral device interface 1203 may be used to connect at least one peripheral device related to input/output (I/O) to the processor 1201 and the memory 1202. In some embodiments, the processor 1201, the memory 1202 and the peripheral device interface 1203 are integrated on the same chip or circuit board. In some other embodiments, any one or two of the processor 1201, the memory 1202 and the peripheral device interface 1203 may be implemented on a separate chip or circuit board, which is not limited in this embodiment.

The radio frequency (RF) circuit 1204 is used for receiving and transmitting RF signals, also called electromagnetic signals. The RF circuit 1204 communicates with a communication network and other communication devices through electromagnetic signals. The RF circuit 1204 converts electrical signals into electromagnetic signals for transmission, or converts received electromagnetic signals into electrical signals. Optionally, the RF circuit 1204 includes an antenna system, an RF transceiver, one or more amplifiers, a tuner, an oscillator, a digital signal processor, a codec chipset, a user identity module card, and the like. The RF circuit 1204 may communicate with other terminals through at least one wireless communication protocol. The wireless communication protocol includes, but is not limited to, world wide web, metropolitan area network, intranet, various generations of mobile communication networks (2G, 3G, 4G, and 5G), wireless local area network and/or WiFi network. In some embodiments, the RF circuit 1204 may also include a circuit related to near field communication (NFC), which is not limited in the present disclosure.

The display screen 1205 is used to display a user interface (UI). The UI may include graphics, text, icons, videos, and any combination thereof. When the display screen 1205 is a touch display screen, the display screen 1205 also has the ability to collect touch signals on or above the surface of the display screen 1205. The touch signal may be input into the processor 1201 as a control signal for processing. In this case, the display screen 1205 may also be used to provide virtual buttons and/or virtual keyboards, also called soft buttons and/or soft keyboards. In some embodiments, there may be one display screen 1205, which is provided on a front panel of the terminal 1200. In other embodiments, there may be at least two display screens 1205, which are respectively arranged on different surfaces of the terminal 1200 or in a folded design. In still other embodiments, the display screen 1205 may be a flexible display screen, which is arranged on a curved surface or a folding surface of the terminal 1200. Further, the display screen 1205 may also be arranged as a non-rectangular irregular pattern, that is, a special-shaped screen. The display screen 1205 may be made of materials such as liquid crystal display (LCD), organic light-emitting diode (OLED) and the like.

The camera component 1206 is used to capture images or videos. Optionally, the camera component 1206 includes a front camera and a rear camera. Generally, the front camera is provided on the front panel of the terminal, and the rear camera is provided on the back of the terminal. In some embodiments, there are at least two rear cameras, each of which is any one of a main camera, a depth-of-field camera, a wide-angle camera, and a telephoto camera, so as to realize the fusion of the main camera and the depth-of-field camera to realize a background blur function and the fusion of the main camera and wide-angle camera to realize a panoramic shooting and virtual reality (VR) shooting function or other fusion shooting functions. In some embodiments, the camera component 1206 may also include a flash. The flash may be a single-color temperature flash or a dual-color temperature flash. The dual-color temperature flash refers to a combination of a warm light flash and a cold light flash, which may be used for light compensation under different color temperatures.

The audio circuit 1207 may include a microphone and a speaker. The microphone is used to collect sound waves of a user and environment, and convert the sound waves into electrical signals and input the same to the processor 1201 for processing, or input the same to the RF circuit 1204 to implement voice communication. For the purpose of stereo collection or noise reduction, there may be a plurality of microphones, which are respectively provided in different parts of the terminal 1200. The microphone may also be an array microphone or an omnidirectional collection microphone. The speaker is used to convert the electrical signal from the processor 1201 or the RF circuit 1204 into sound waves. The speaker may be a traditional thin-film speaker or a piezoelectric ceramic speaker. When the speaker is a piezoelectric ceramic speaker, it can not only convert electrical signals into sound waves that are audible to humans, but also convert electrical signals into sound waves that are inaudible to humans for distance measurement and other purposes. In some embodiments, the audio circuit 1207 may also include a headphone jack.

The positioning component 1208 is used to locate a current geographic location of the terminal 1200 to implement navigation or location-based service (LBS). The positioning component 1208 may be a positioning component based on the global positioning system (GPS) of the United States, the Beidou system of China, or the Galileo system of Russia.

The power supply 1209 is used to supply power to various components in the terminal 1200. The power supply 1209 may be alternating current, direct current, disposable batteries, or rechargeable batteries. When the power supply 1209 includes a rechargeable battery, the rechargeable battery may be a wired rechargeable battery or a wireless rechargeable battery. The wired rechargeable battery is a battery charged over a wired line, and the wireless rechargeable battery is a battery charged over a wireless coil. The rechargeable battery may also be used to support fast charging technology.

In some embodiments, the terminal 1200 further includes one or more sensors 1210. The one or more sensors 1210 include, but are not limited to, an acceleration sensor 1211, a gyroscope sensor 1212, a pressure sensor 1213, a fingerprint sensor 1214, an optical sensor 1215, and a proximity sensor 1216.

The acceleration sensor 1211 may detect the magnitude of acceleration on three coordinate axes of a coordinate system established by the terminal 1200. For example, the acceleration sensor 1211 may be used to detect components of a gravitational acceleration on the three coordinate axes. The processor 1201 may control the touch screen 1205 to display the user interface in a horizontal view or a vertical view based on a gravity acceleration signal collected by the acceleration sensor 1211. The acceleration sensor 1211 may also be used for the collection of game or user motion data.

The gyroscope sensor 1212 may detect a body direction and a rotation angle of the terminal 1200, and may be cooperated with the acceleration sensor 1211 to collect the user's 3D actions on the terminal 1200. The processor 1201 may implement the following functions based on the data collected by the gyroscope sensor 1212: motion sensing (e.g., changing the UI based on the user's tilt operation), image stabilization during shooting, game control, and inertial navigation.

The pressure sensor 1213 may be disposed on a side frame of the terminal 1200 and/or a lower layer of the touch display screen 1205. When the pressure sensor 1213 is arranged on the side frame of the terminal 1200, the user's holding signal of the terminal 1200 may be detected. The processor 1201 performs left and right hand recognition or quick operation based on the holding signal collected by the pressure sensor 1213. When the pressure sensor 1213 is arranged on the lower layer of the touch display screen 1205, the processor 1201 controls operability controls on the UI interface based on the user's pressure operation on the touch display screen 1205. The operability controls include at least one of a button control, a scroll bar control, an icon control, and a menu control.

The fingerprint sensor 1214 is used to collect the user's fingerprint. The processor 1201 identifies the user's identity based on the fingerprint collected by the fingerprint sensor 1214. Alternatively, the fingerprint sensor 1214 identifies the user's identity based on the collected fingerprint. When the user's identity is recognized as a trusted identity, the processor 1201 authorizes the user to perform related sensitive operations, including unlocking the screen, viewing encrypted information, downloading software, paying, and changing settings. The fingerprint sensor 1214 may be provided on the front, back or side of the terminal 1200. When a physical button or a manufacturer logo is provided on the terminal 1200, the fingerprint sensor 1214 may be integrated with the physical button or the manufacturer logo.

The optical sensor 1215 is used to collect ambient light intensity. In an embodiment, the processor 1201 may control display brightness of the touch screen 1205 based on the ambient light intensity collected by the optical sensor 1215. Specifically, when the ambient light intensity is high, the display brightness of the touch display screen 1205 is increased. When the ambient light intensity is low, the display brightness of the touch display screen 1205 is decreased. In another embodiment, the processor 1201 may also dynamically adjust shooting parameters of the camera component 1206 based on the ambient light intensity collected by the optical sensor 1215.

The proximity sensor 1216, also called distance sensor, is usually arranged on the front panel of the terminal 1200. The proximity sensor 1216 is used to collect a distance between the user and the front of the terminal 1200. In an embodiment, when the proximity sensor 1216 detects that the distance between the user and the front of the terminal 1200 gradually decreases, the processor 1201 controls the touch screen 1205 to switch from an on-screen state to an off-screen state. When the proximity sensor 1216 detects the distance between the user and the front of the terminal 1200 gradually increases, the processor 1201 controls the touch display screen 1205 to switch from an off-screen state to an on-screen state.

Those skilled in the art can understand that the structure shown in FIG. 10 does not constitute a limitation on the terminal 1200. The terminal 1200 may include more or fewer components than those shown in the figure, or combine certain components, or adopt different component layouts.

The present disclosure also provides a computer-readable storage medium storing at least one instruction, at least one program, a code set or an instruction set therein. The at least one instruction, the at least one program, the code set or the instruction set, when loaded and run by the processor, causes the processor to perform the method for playing music according to the foregoing method embodiment.

Optionally, the present disclosure also provides a computer program product containing instructions, which when run on a computer, causes the computer to execute the method for playing music described in the foregoing aspects.

It should be understood that the "and/or" mentioned herein refers to that there may be three relationships. For example, A and/or B refers to three situations: A alone exists, A and B exist at the same time, B alone exists. The character "/" generally indicates that the associated objects before and after are in an "or" relationship.

The sequence numbers of the foregoing embodiments of the present disclosure are only for description, and do not represent the advantages and disadvantages of the embodiments.

Those skilled in the art can understand that all or some of the steps in the above-mentioned embodiments may be implemented by hardware, or by a program to instruct related hardware. The program may be stored in a computer-readable storage medium. The above-mentioned storage medium may be a read-only memory, a magnetic disk or an optical disk, etc.

Described above are merely exemplary embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A method for playing music, applicable to a terminal provided with a music player, comprising:
    playing first music by the music player, and playing a video associated with the first music in a music playback page by displaying video pictures of the video in a background page of the music playback page, wherein an audio of the video is not played while the video pictures are displayed, and the first music corresponds to at least two videos;
    receiving a video switching operation in the music playback page, wherein the video switching operation comprises at least one of a swipe operation, a tap operation, a long press operation, and a press operation; and
    switching the video being played in the music playback page to another, different video associated with the first music in response to the video switching operation, and continuing playing the first music by the music player, wherein switching the video comprises selecting a video with a bpm similar to a bpm of the first music and according to video popularity, video click-rate, upload time, or a number of likes.

2. The method according to claim 1, wherein
    the first music comprises n music clips, each of the music clips corresponding to a video group, the video group comprising at least one video; and
    playing the video in the music playback page comprises:
        determining, according to a playback progress of the first music, a target music clip being currently played;
        determining a target video from a target video group corresponding to the target music clip; and
        playing the target video in the music playback page.

3. The method according to claim 2, wherein switching the video being played in the music playback page in response to the video switching operation comprises:
    acquiring another video from the target video group, wherein the another video is a video other than the target video; and
    playing the another video in the music playback page.

4. The method according to claim 3, wherein playing the another video in the music playback page comprises:
    acquiring a playback duration where the target music clip has been played in response to the video switching operation;
    determining a playback start point of the another video according to the playback duration; and
    playing the another video in the music playback page according to the playback start point.

5. The method according to claim 2, wherein determining the target video from the target video group corresponding to the target music clip comprises:
    determining a video uploaded by a target account as the target video in response to the target video group comprising the video uploaded by the target account, wherein the target account comprises at least one of a current login account and a focus account of the music player.

6. The method according to claim 2, wherein beats per minute (BPM) of the video in the video group is first BPM, and BPM of an audio clip to which the video group belongs is second BPM, a similarity between the first BPM and the second BPM being greater than a similarity threshold.

7. The method according to claim 1, wherein after playing the first music by the music player and playing the video in the music playback page, the method further comprises:
    receiving a music switching operation in the music playback page; and
    playing second music by the music player and playing a video corresponding to the second music in the music playback page in response to the music switching operation.

8. The method according to claim 1, wherein continuing playing the first music by the music player comprises:
    continuing playing the first music by the music player while keeping a playback progress of the first music.

9. The method according to claim 1, further comprising:
    displaying account information of an uploader account in the music playback page when the first music is played to a target period, wherein the target period comprises at least one of a prelude period, an interlude period, and a tail period, and the uploader account is an account for uploading the video.

10. A terminal, comprising a processor and a memory storing at least one instruction therein, wherein the at least one instruction, when loaded and run by the processor, causes the processor to perform a method for playing music comprising:

playing first music by the music player, and playing a video associated with the first music in a music playback page by displaying video pictures of the video in a background page of the music playback page, wherein an audio of the video is not played while the video pictures are displayed, and the first music corresponds to at least two videos;

receiving a video switching operation in the music playback page, wherein the video switching operation comprises at least one of a swipe operation, a tap operation, a long press operation, and a press operation; and switching the video being played in the music playback page to another, different video associated with the first music in response to the video switching operation, and continuing playing the first music by the music player, wherein switching the video comprises selecting a video with a bpm similar to a bpm of the first music and according to video popularity, video click-rate, upload time, or a number of likes.

11. The terminal according to claim 10, wherein
the first music comprises n music clips, each of the music clips corresponds to a video group, the video group comprising at least one video; and
playing the video in a music playback page comprises:
determining, according to a playback progress of the first music, a target music clip being currently played;
determining a target video from a target video group corresponding to the target music clip; and
playing the target video in the music playback page.

12. The terminal according to claim 11, wherein switching the video played in the music playback page in response to the video switching operation comprises:
acquiring another video from the target video group, wherein the another video is a video other than the target video; and
playing the another video in the music playback page.

13. The terminal according to claim 12, wherein playing the another video in the music playback page comprises:
acquiring a playback duration where the target music clip has been played in response to receiving the video switching operation;
determining a playback start point of the another video according to the playback duration; and
playing the another video in the music playback page according to the playback start point.

14. The terminal according to claim 11, wherein determining the target video from the target video group corresponding to the target music clip comprises:
determining a video uploaded by a target account as the target video in response to the target video group comprising the video uploaded by the target account, wherein the target account comprises at least one of a current login account and a focus account of the music player.

15. The terminal according to claim 11, wherein beats per minute (BPM) of the video in the video group is first BPM, and BPM of an audio clip to which the video group belongs is second BPM, a similarity between the first BPM and the second BPM being greater than a similarity threshold.

16. The terminal according to claim 10, wherein after playing the first music by the music player and playing the video in the music playback page, the method further comprises:
receiving a music switching operation in the music playback page; and
playing second music by the music player and playing a video corresponding to the second music in the music playback page in response to the music switching operation.

17. The terminal according to claim 10, wherein continuing playing the first music by the music player comprises:
continuing playing the first music by the music player while keeping a playback progress of the first music.

18. The terminal according to claim 10, wherein the method further comprises:
displaying account information of an uploader account in the music playback page when the first music is played to a target period, wherein the target period comprises at least one of a prelude period, an interlude period, and a tail period, and the uploader account is an account for uploading the video.

19. A non-transitory computer-readable storage medium storing at least one instruction therein, wherein the at least one instruction, when loaded and run by a processor, causes the processor to perform the method for playing music comprises:
playing first music by the music player, and playing a video associated with the first music in a music playback page by displaying video pictures of the video in a background page of the music playback page, wherein an audio of the video is not played while the video pictures are displayed, and the first music corresponds to at least two videos;
receiving a video switching operation in the music playback page, wherein the video switching operation comprises at least one of a swipe operation, a tap operation, a long press operation, and a press operation; and
switching the video being played in the music playback page to another, different video associated with the first music in response to the video switching operation, and continuing playing the first music by the music player, wherein switching the video comprises selecting a video with a bpm similar to a bpm of the first music and according to video popularity, video click-rate, upload time, or a number of likes.

20. The non-transitory computer-readable storage medium according to claim 19, wherein
the first music comprises n music clips, each of the music clips corresponding to a video group, the video group comprising at least one video; and
playing the video in the music playback page comprises:
determining, according to a playback progress of the first music, a target music clip being currently played;
determining a target video from a target video group corresponding to the target music clip; and
playing the target video in the music playback page.

* * * * *